July 14, 1931.                B. R. BAYNE                    1,813,901
         MANUFACTURE OF COLORED PATTERNED GLASS AND
            OTHER TRANSPARENCIES OR TRANSLUCENCIES
                     Filed Oct. 5, 1929
*Fig. 1.*
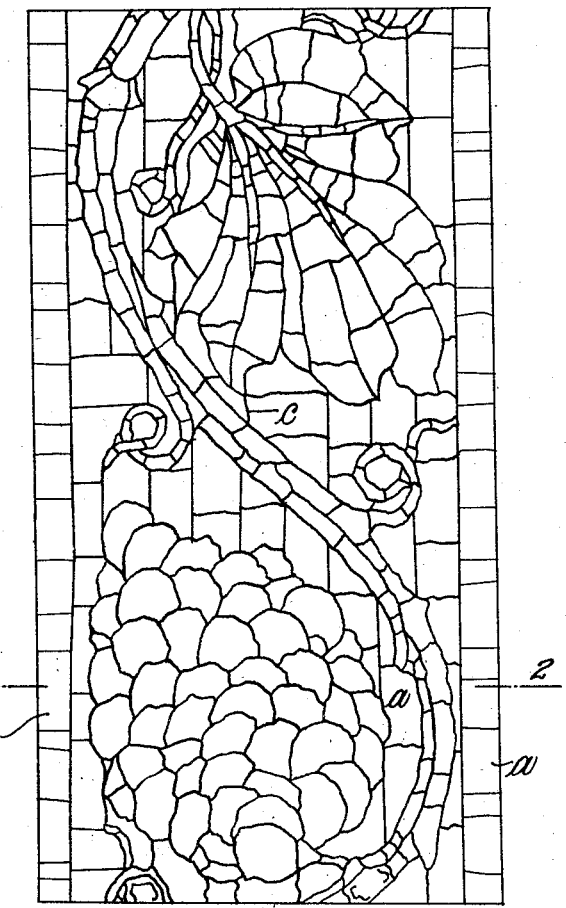
*Fig. 2.*
Inventor:
BASIL RICHARD BAYNE.
by his Attorney: Percy Hadden, Patented July 14, 1931

1,813,901

UNITED STATES PATENT OFFICE

BASIL RICHARD BAYNE, OF GERRARDS CROSS, ENGLAND

MANUFACTURE OF COLORED PATTERNED GLASS AND OTHER TRANSPARENCIES OR TRANSLUCENCIES

Application filed October 5, 1929, Serial No. 397,668, and in Great Britain November 9, 1928.

In known method of manufacturing colored patterned glass such for instance as used for forming stained glass windows, panels or the like it is usual to form the design of a number of pieces of sheet glass either simply colored or on which the elements of the design have been drawn and colored, each of these pieces having to be specially cut to shape by hand this being effected in the case where complex patterns are required by following a "cut line" that is to say the outlines of the design drawn full size on a sheet of paper or the like and on which the glass to form the pattern is laid and cut. Each of the so obtained pieces of glass are then fired in a suitable furnace and after cooling the pieces are built up side by side by means of "leading" into a sheet or panel showing the completed design the leading occupying the place of the "cut line".

This known method is expensive to work and further has the disadvantage that small designs are unsatisfactory as the amount of leading becomes large in proportion to the size of the design, for instance in pieces of stained glass below a size of two inches square the amount of leading out weighs the design.

The object of my invention is to provide a method of manufacturing multi-colored transparent or translucent pictures, designs or devices in which not only "leading" between the individual colors is dispensed with but also the extremely intricate and particular cutting required in the "leading" method of individual pieces of colored glass which are to form the pattern and consequently also the expense thereof. Further with my improved method I do not attempt to imitate the technique or appearance of the usual form of leaded stained glass but obtain a product giving highly intricate color patterns of great beauty, wealth of detail and artistic effect which it is impossible to obtain with "leaded" stained glass in fact as many as fifty or more different pieces of vari-colored glass may be contained in one square inch of the finished work.

The method is also cheap to work owing to the fact that it allows the use of waste colored glass and further that actual drawing or painting of detail is not necessary.

Instead of using glass I may employ other transparent or semi-transparent substances in my method as will hereinafter be described.

My invention consists broadly in a method of manufacturing colored patterned glass or other transparencies or, translucencies consisting in fusing or causing to cohere by cementation small variously colored or colorless individual mosaic like elements of transparent or semi-transparent material to a base of transparent or semi-transparent material and in juxtaposition to one another so as to form a composite transparent or semi-transparent multi-colored design pattern or the like on said base, all interstices between the elements being treated by any of the methods hereinafter described.

In using glass for my improved method of manufacture I first provide a number of variously colored and colorless and relatively small pieces of glass, having flat or suitable surfaces on at least one side. These pieces which are of regular or irregular shape both as regards their outlines and their front surfaces, for instance the edges of these surfaces may be rounded to enhance the effect, may be termed tesseræ or mosaic elements and can be cut from waste glass sheet or be obtained from other form of glass and the general size of same would be in accordance with the size of the finished picture and the amount of detail required therein.

Upon a base or support of clear or semi-clear glass which may be colored or plain I arrange or lay out these elements in suitable juxtaposition so as to form a design or picture much in the manner of mosaic.

This base or support may be in the form of a flat or curved sheet or it may be a hollow or solid glass object of suitable form to which the elements can be applied.

The annexed drawings illustrate an example of construction of the invention.

Fig. 1 is a plan view of a panel of patterned glass and,

Fig. 2 is a section on line 2—2 of Fig. 1.

The elements $a$ are in the first instance simply placed in position or held in place on the base or caused to adhere thereto, the base in this instance being a flat sheet of glass *b*, to form the mosaic pattern or design by means of a suitable flux or adhesive or the two combined and the sheet or the like is then fired at a suitable temperature and to such extent as to cause the elements *a* to become fused to the glass support *b* but not to such extent as to cause them intentionally to melt and "run" into one another.

The interstices such as *c* between the elements may be left unfilled or may be suitably filled either before firing with fusible, or after firing with infusible substances of any color, which may be transparent, semi-transparent or opaque and such filling can be silvered, gilded or ornamented. Alternatively the interstices may be filled by electrically deposited copper or the like, or they may be filled by laying or adhering the elements on the base so that their edges are in close proximity which are then connected by firing.

In a modification of construction and in the case where the base carrying the elements is of flat or other simple shape I may place the elements between the base and a sheet or protecting cover of glass; the elements being fused or caused to cohere to the base and the cover or to either of these or not connected to either the interstices between the elements being treated by any of the methods described for that purpose.

The artistic effect of the stained glass picture design or the like may be further enhanced by the use in or upon the elements or the base or covering glasses of fusible or infusible pigments, enamels, stains, fluxes or metallic films or the like, or by the use of acids such as hydrofluoric or other acids.

In a further modification I may attach the elements temporarily to the base by means of a suitable adhesive and fill the interstices between them with a suitable glass solder consisting for instance of a mixture of tin and zinc or of tin and aluminium, the whole being heated to a temperature sufficient to melt the solder and cause it to adhere permanently to the base glass and the edges of the elements thereby forming a solid structure; in this case also a covering glass may or may not be used.

In certain cases, I may dispense with the firing, the elements being caused to cohere to the base by the use of such mediums as water-glass cement or the like, further instead of using glass for my method I may employ other transparent or semi-transparent substances such as celluloid either entirely or in combination with glass, in this case of course no firing would be required.

Further instead of placing individual elements on the base to build up a pattern they may be poured and spread haphazard or in design formation on the base previously coated with flux or not, the base being previously brought to a suitable degree of plasticity or conversely the material which is to form the base may be poured or spread upon the elements previously laid out and brought to a suitable degree of plasticity.

In making a picture by my improved method the whole may consist of one large panel or may be built up of a series of small panels suitably joined together by leading or the like.

In building large pictures or designs separate panels of painted glass or other transparencies or translucencies, such for instance as the head of a figure may be inserted in the picture if required.

What I claim as my invention and desire to secure by Letters Patent of the United States is:—

1. A method of manufacturing colored patterned glass wherein individual elements of glass are first caused to adhere to a glass base by means of an adhesive and flux to form the design, the whole being then fired at a suitable temperature to cause the elements to become fused through said flux to the glass base and then filling in the interstices between said elements so as to form a mosaic-like design on said base substantially as described.

2. A method as claimed in claim 1 wherein the interstices between the elements are filled with a fusible substance the whole being then heated to a temperature sufficient to melt the fusible substance substantially as described.

3. A method as in claim 1 wherein the interstices are filled by connecting the edges of the elements by firing substantially as described.

4. A method as in claim 1 wherein the elements are placed between the base and a protecting cover of glass substantially as described.

BASIL RICHARD BAYNE.